United States Patent
Price et al.

(10) Patent No.: US 6,770,056 B2
(45) Date of Patent: Aug. 3, 2004

(54) DISPENSING DEVICE

(75) Inventors: Phil T. Price, Oxford (GB); Stephanie Bley, Basel (CH); Bernard Sams, London (GB)

(73) Assignee: Novartis AG, Basel (CH)

(*) Notice: Subject to any disclaimer, the term of this patent is extended or adjusted under 35 U.S.C. 154(b) by 156 days.

(21) Appl. No.: 10/182,296

(22) PCT Filed: Jan. 26, 2001

(86) PCT No.: PCT/EP01/00860
§ 371 (c)(1),
(2), (4) Date: Aug. 22, 2002

(87) PCT Pub. No.: WO01/55681
PCT Pub. Date: Aug. 2, 2001

(65) Prior Publication Data
US 2003/0078496 A1 Apr. 24, 2003

(30) Foreign Application Priority Data
Jan. 28, 2000 (GB) .............................................. 0002095

(51) Int. Cl.$^7$ ........................ A61M 5/00; A61M 5/178; B67D 5/22
(52) U.S. Cl. ...................... 604/246; 604/186; 604/207; 222/43
(58) Field of Search ............................. 604/186, 207, 604/208, 209, 246; 222/43

(56) References Cited

U.S. PATENT DOCUMENTS

| | | | | |
|---|---|---|---|---|
| 3,749,284 A | * | 7/1973 | Kloehn | 222/43 |
| 4,526,294 A | * | 7/1985 | Hirschmann et al. | 222/47 |
| 4,563,178 A | * | 1/1986 | Santeramo | 604/208 |
| 5,116,319 A | * | 5/1992 | van den Haak | 604/110 |
| 5,511,695 A | | 4/1996 | Chia et al. | |

FOREIGN PATENT DOCUMENTS

| | | |
|---|---|---|
| DE | 26 11 493 A | 9/1977 |
| DE | 41 37 353 A | 5/1993 |

* cited by examiner

Primary Examiner—Brian L. Casler
Assistant Examiner—Lina R Kontos
(74) Attorney, Agent, or Firm—J. Wilusz, Jr.; John W. Kung

(57) ABSTRACT

A device for dispensing a measured dose of liquid from an attached container which container has an elongate casing defining a dispensing cylinder, one end of the casing being adapted for mounting on the container. A plurality of dose indications are provided on the external surface of the casing so that a dose may be pre-selected by moving a dose setting collar along the casing. The collar has a stop engageable with a selected one of a multiplicity of recesses on the casing to secure the collar at the required position. A plunger having a piston co-operating with a cylinder defined by the casing is movable to lift the piston from said one end of the casing until the piston abuts the dose setting collar so charging the dispenser. Depression of the plunger to move the piston back to said one end dispenses the selected dose from an outlet port.

24 Claims, 13 Drawing Sheets

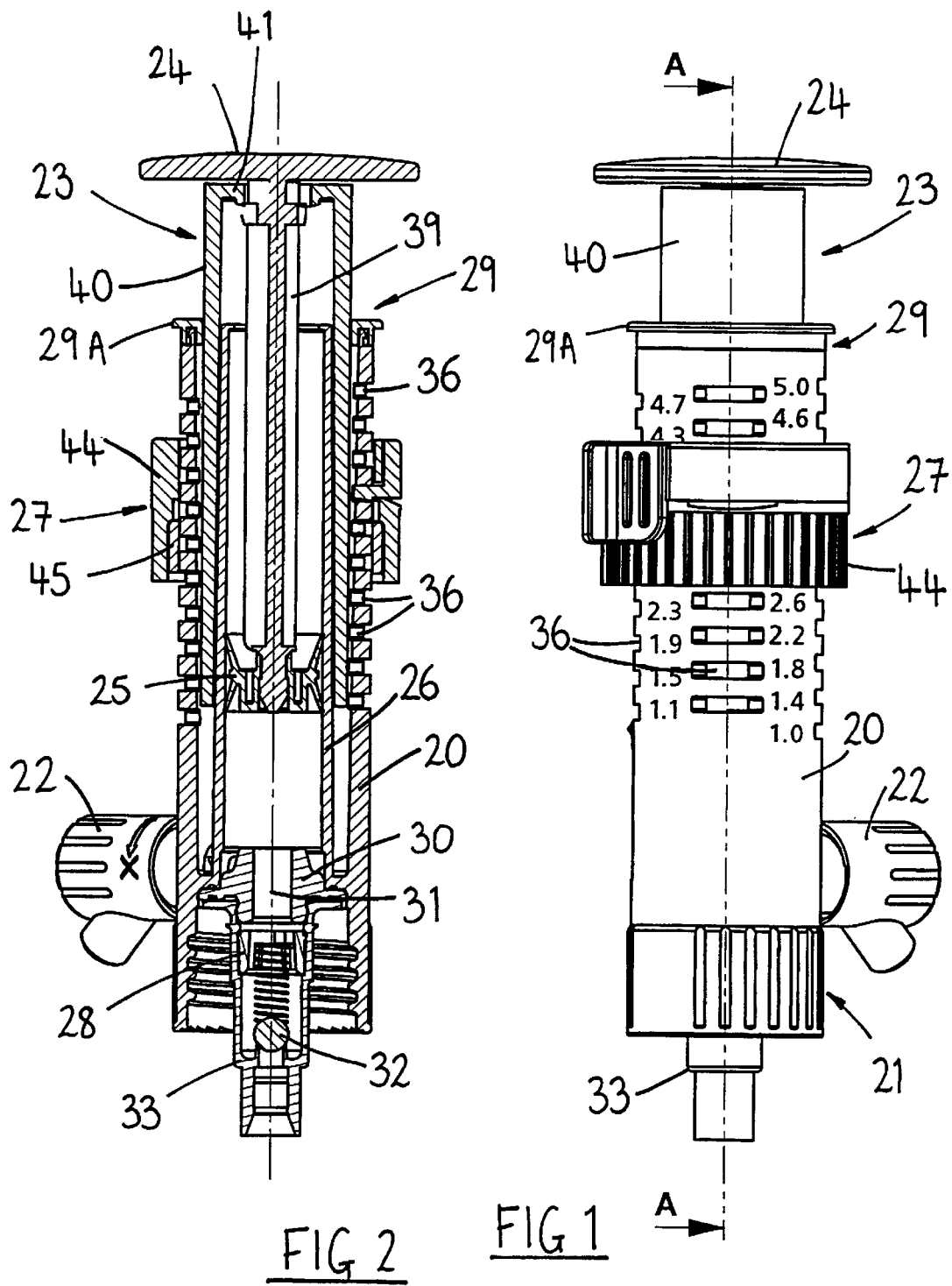

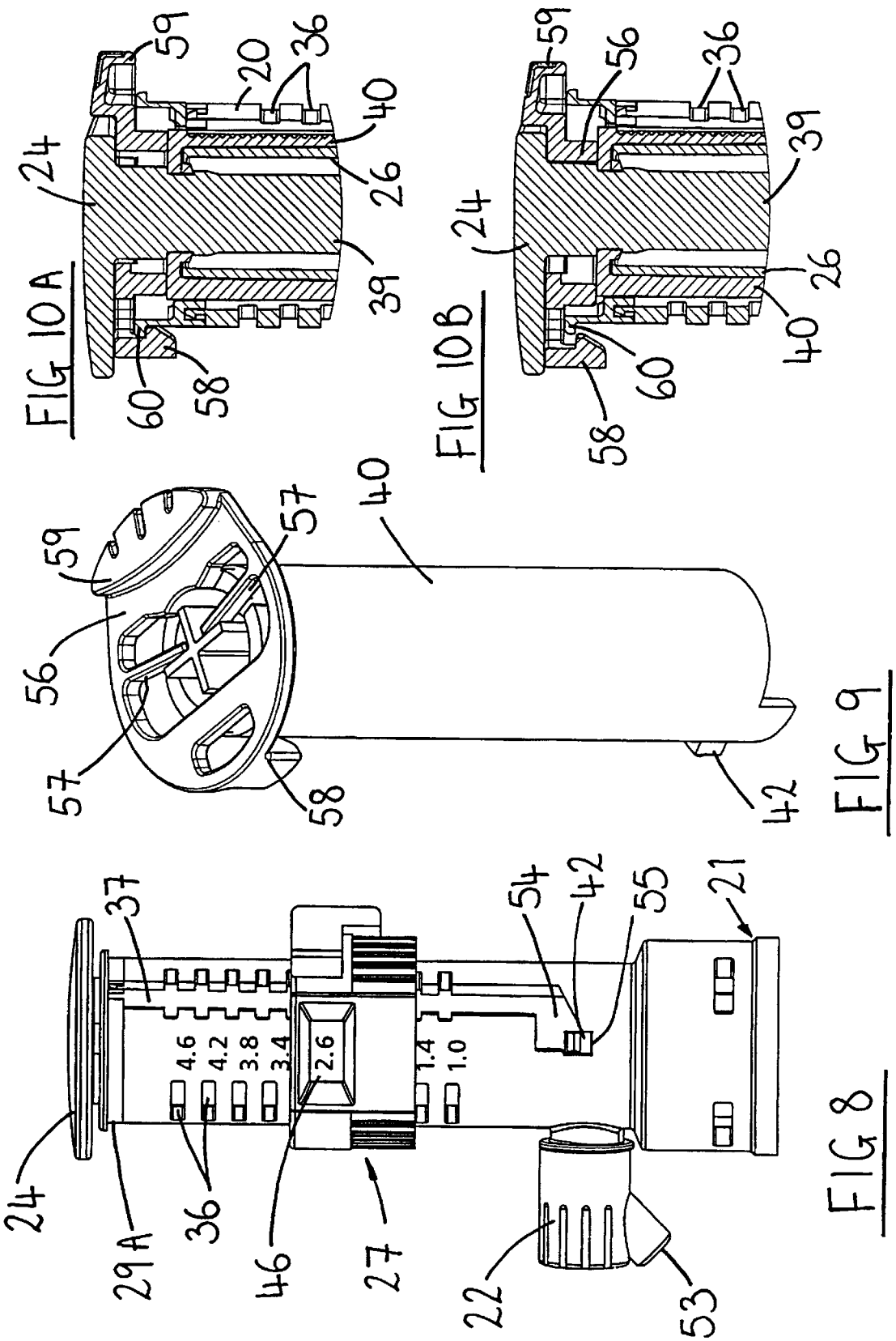

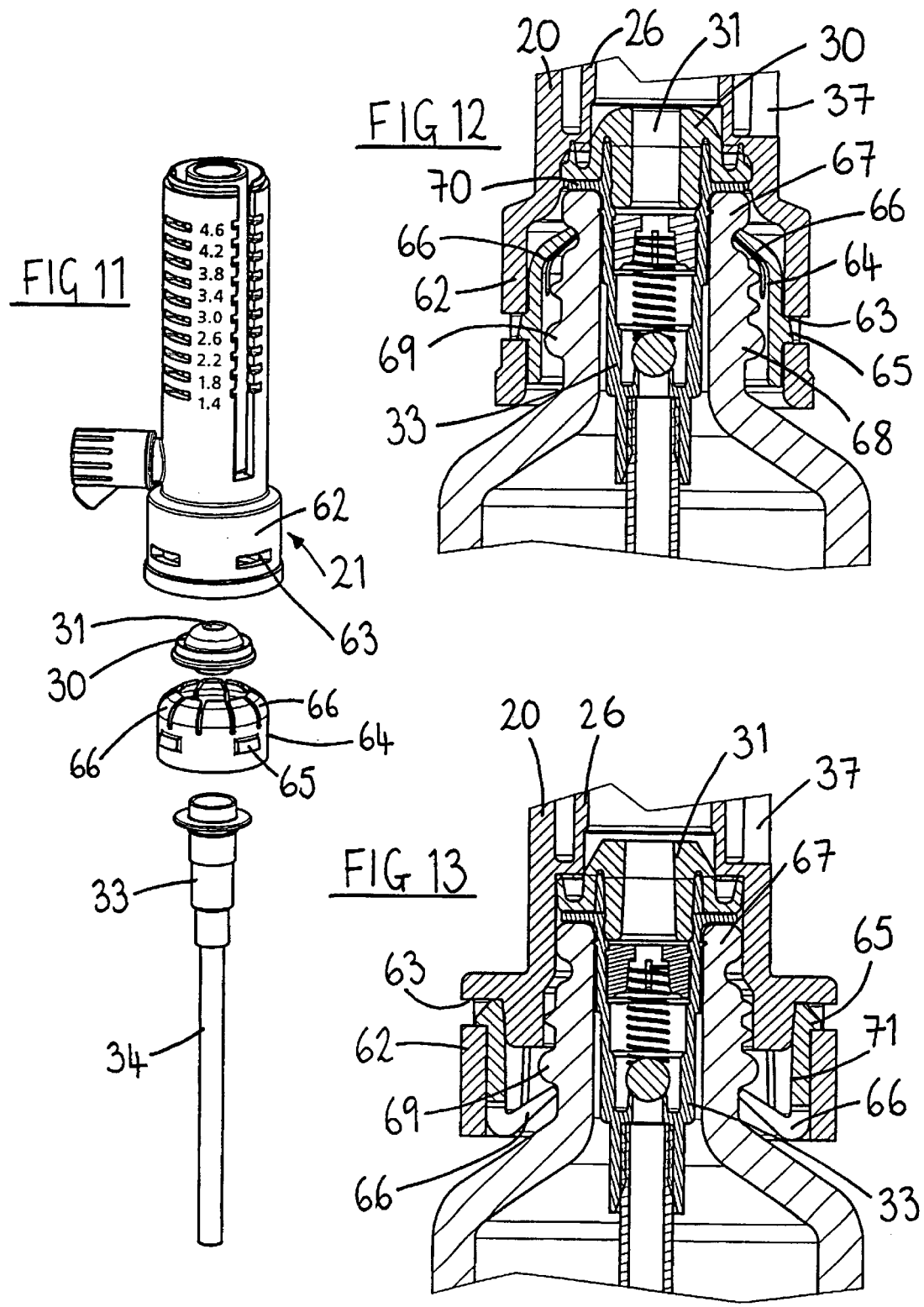

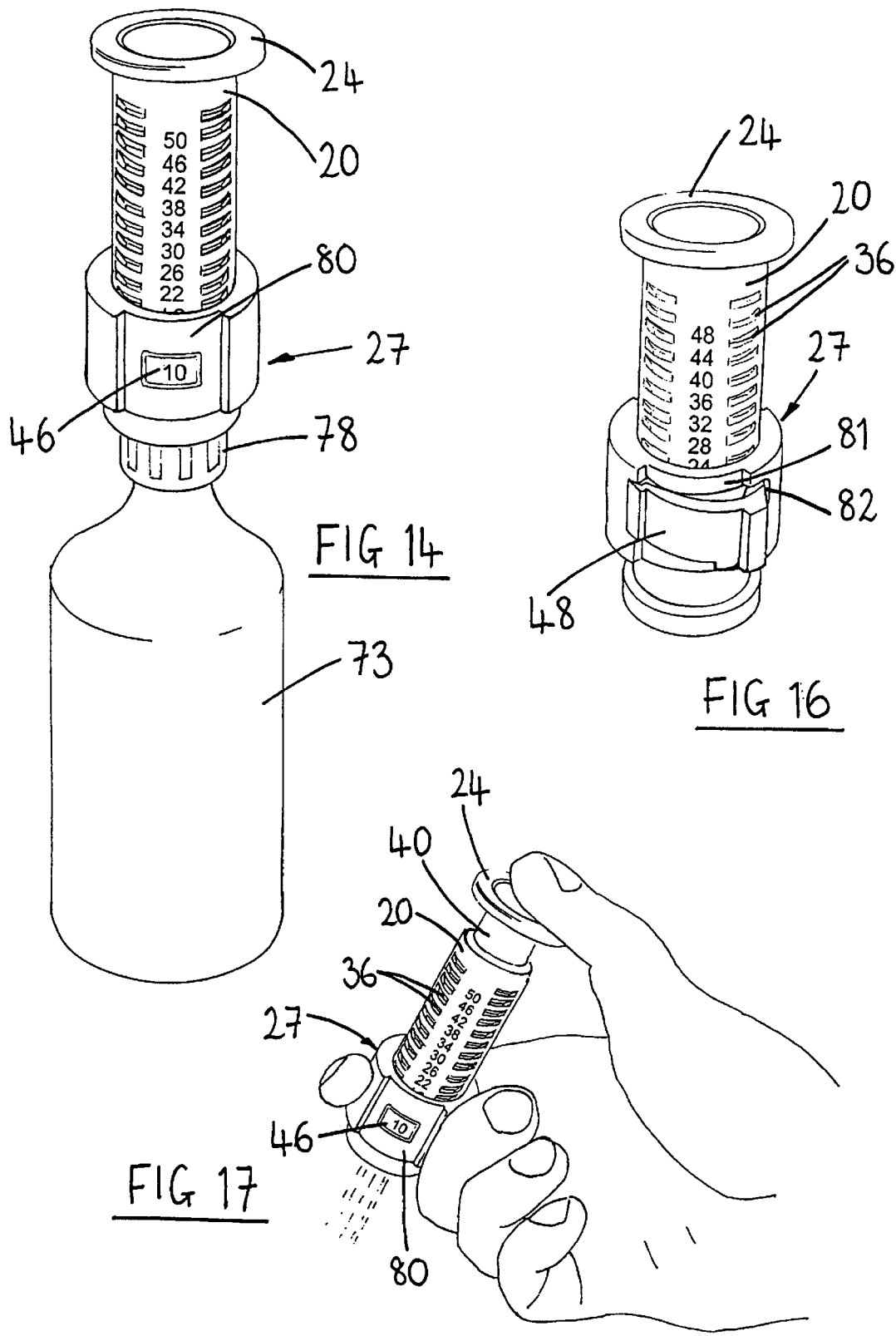

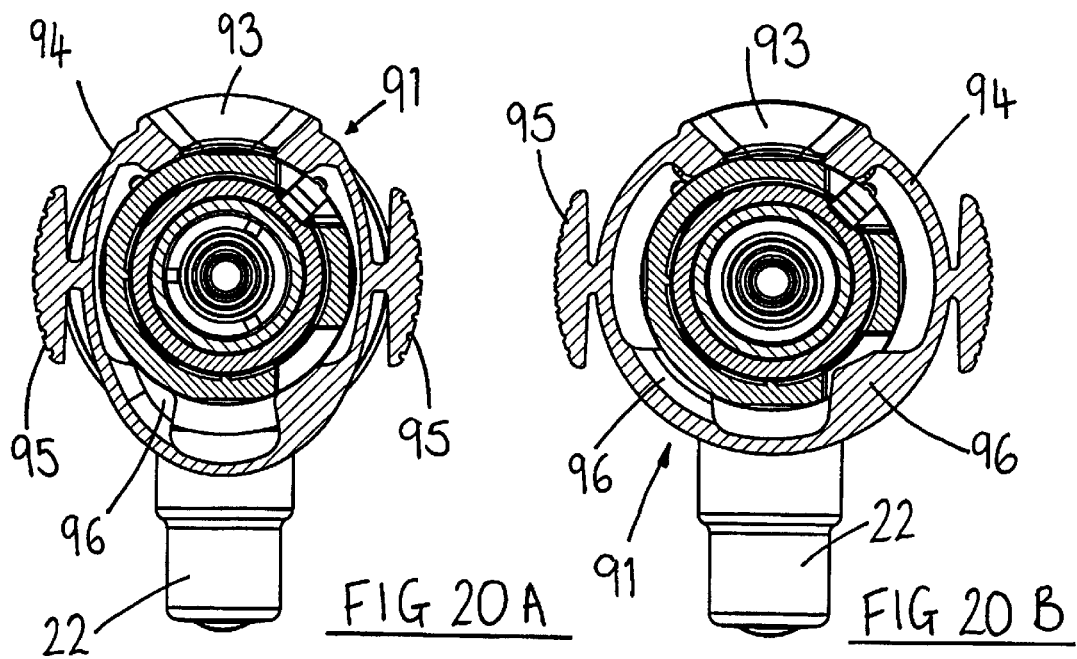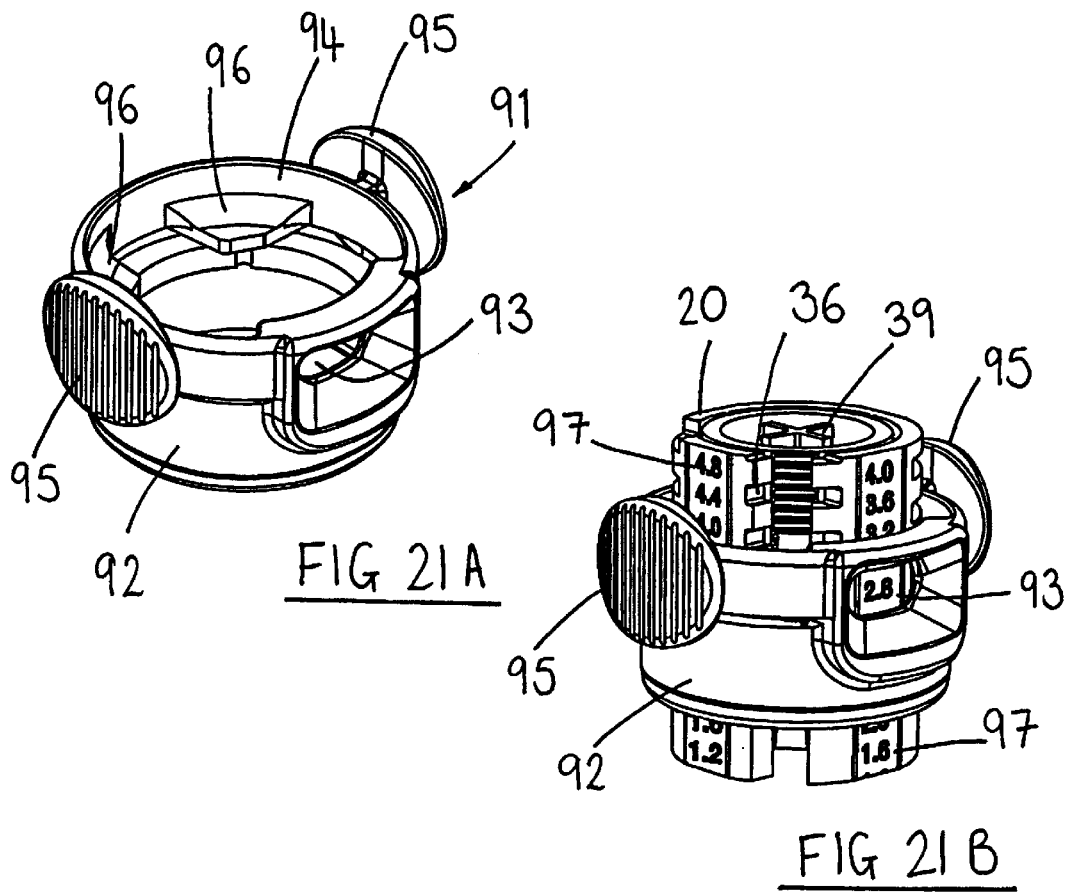

DISPENSING DEVICE

This application is a 371 of International PCT Application No. EP01/00860, filed Jan. 26, 2001.

This invention relates to dosing apparatus, arranged to permit the dispensing of a measured dose (volume) of a liquid from a container to which the apparatus is connected. Though the apparatus may be used with a wide variety of liquids, it finds a particular application in the dispensing of a pharmaceutical composition.

There is a need for a dispenser able repeatedly to dispense a pre-determined volume of liquid such as a pharmaceutical composition from a container usually in the form of a bottle, in which the liquid is stored. Though there have been several proposals for such dispensers, these all have various disadvantages and there is no satisfactory device available commercially which adequately fulfils all requirements.

According to the present invention, there is provided dispensing apparatus for dispensing a measured dose of liquid from an attached container, which apparatus comprises: an elongate casing defining a dispensing cylinder, one end of the casing being adapted for mounting on a container and the cylinder being open at the other end thereof, the cylinder being arranged to communicate with an attached container and having a liquid outlet port adjacent said one end; a plurality of dose indications provided on the external surface of the casing; a channel formed in the wall of the casing and extending along the length of the cylinder; a plunger having a piston co-operatively slidable within the cylinder for pumping liquid out of the attached container and through said outlet port; a dose control member connected to the plunger and arranged to slide in said channel; a dose-setting collar slideable over the external surface of the casing for alignment with a selected dose indication, the collar and dose control member being interengageable to limit the movement of the plunger away from said one end; and restraining means arranged between the dose-setting collar and the casing to secure the collar with respect to the casing at a selected dose setting.

It will be appreciated that, in use, the dose-setting collar is moved along the casing to a position corresponding to a required dose and is then secured at that position. Thereafter, on cycling the plunger from an initial position until its movement is blocked by the collar and then returning the plunger to its initial position, the required volume of liquid is drawn into the dispensing cylinder and then ejected therefrom.

In a particularly preferred embodiment of dispenser of this invention, the casing provides a cylindrical chamber and the dispensing cylinder is defined by a cylindrical tube mounted within the chamber at the one end of the casing, so that there is an annular clearance between the internal wall of the casing and the external wall of the tube. The channel may then be formed wholly through the wall of the casing, so as to communicate with the annular clearance. The dose control member may be a sleeve slideably mounted within the annular clearance and coupled to the plunger at the upper end thereof—that is, at the end of the plunger remote from said one end of the casing. Such as sleeve may have a first abutment which locates in the channel for sliding movement therealong as the plunger is cycled.

Preferably, the dose-setting collar defines a second abutment which runs in the channel as the collar is moved to the required dose setting and which is engaged by the first abutment on sliding the plunger away from the one end of the casing.

The restraining means advantageously comprises a plurality of stop elements arranged along the length of the casing, the collar being engageable with a selected stop element to be restrained against movement away therefrom. To increase the number of axial positions at which the collar may be secured with respect to the casing, such stop elements preferably are arranged helically around the casing. In a preferred embodiment, each such stop element is in the form of a recess or opening through the wall of the casing, the collar having a peg which is engageable in a selected recess. Such a peg may be mounted on an arm connected to the collar and moveable between free and secured positions. Alternatively, the peg may be formed on a band which encircles with clearance the casing, the band being resiliently deformable to move the peg away from the casing and so free the collar for movement along the length of the casing.

Advantageously the dispensing apparatus is provided with a mechanism which is difficult for a child to operate, so as to confer a degree of child-resistance to the apparatus. In one embodiment, the channel has an extension into which a part of the dose control member may be received, the release of the dose control member from the extension requiring a complex action. An alternative form provides a catch mechanism adjacent the upper end of the plunger and which is engageable with an abutment on the casing. In one embodiment, the release of the catch mechanism requires a transverse force to be applied to a catch member. In another, a press-button is provided on a cap for the plunger, which button when depressed releases the cap to permit the plunger to be drawn upwardly and charge the dispenser with a dose. In yet another embodiment, a cap for the plunger is held to the casing by interengaging elements, until the cap is turned to a defined position where those elements may disengage and permit the plunger to be drawn upwardly.

A typical bottle for containing a liquid to be dispensed by the apparatus of this invention will have a neck with external screw threads. The one end (the lower end, in use) of the casing may be provided with internal threads engageable with those of the neck to secure the casing to the bottle but in alternative embodiments, the one end of the casing is provided with resilient, inwardly directed fingers which are engageable behind formations on the neck of the bottle, to secure the casing in position. Suitable profiling of the neck of the bottle and of the fingers may make it impossible to remove the casing without destroying one or the other of the casing or the bottle neck, so as to eliminate the likelihood of contamination of the liquid in the bottle, once opened.

By way of example only, certain specific embodiments of liquid dispenser arranged in accordance with the present invention will now be described in detail, reference being made to the accompanying drawings, in which:

FIG. 1 is a side view of a first embodiment of liquid dispenser;

FIG. 2 is an axial section through the dispenser of FIG. 1 taken on line A—A on that Figure;

FIG. 8 shows a modified form of casing for the dispenser of FIG. 1, to provide a child-resistant feature;

FIG. 9 shows a modified form of plunger sleeve for the dispenser of FIG. 1, to provide an alternate child-resistant feature;

FIGS. 10A and 10B are sectional views on the plunger sleeve of FIG. 9, respectively in latched and released positions;

FIG. 11 is an exploded perspective view of the dispenser casing together with bottle neck lock and a dip-pipe;

FIG. 12 is a sectional view through the lower end of the casing of FIG. 11, when connected to a bottle;

FIG. 13 is a sectional view through an alternate form of the lower end of the casing, when connected to a bottle;

FIG. 14 is a perspective view of a second embodiment of dispenser, shown connected to a bottle;

FIG. 16 is a perspective view of the casing, collar and plunger head of the dispenser of FIGS. 14 and 15;

FIG. 17 shows the dispenser of FIG. 16 being used to dispense a dose of liquid;

FIGS. 20A and 20B show a modified form of collar, co-operating with a modified cylindrical casing and respectively in free and engaged positions;

FIGS. 21A and 21B are isometric views of the collar of FIGS. 20A and 20B, respectively free and mounted on the modified casing;

Figure 4:
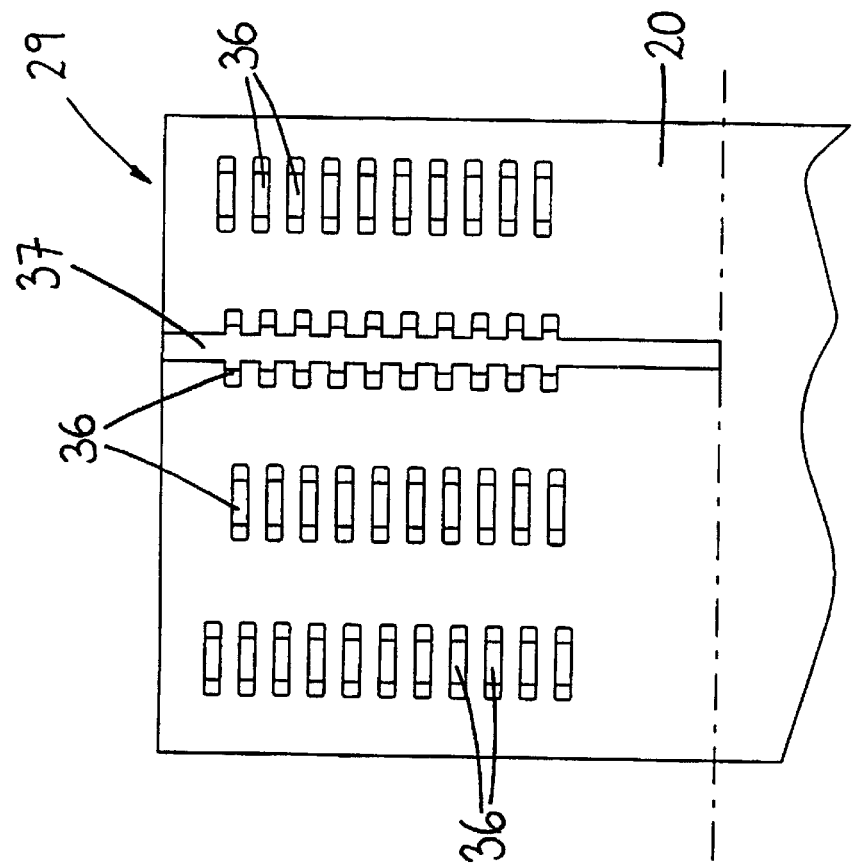
FIG. 4 is a developed view of part of the casing of FIG. 3.
Figure 3:
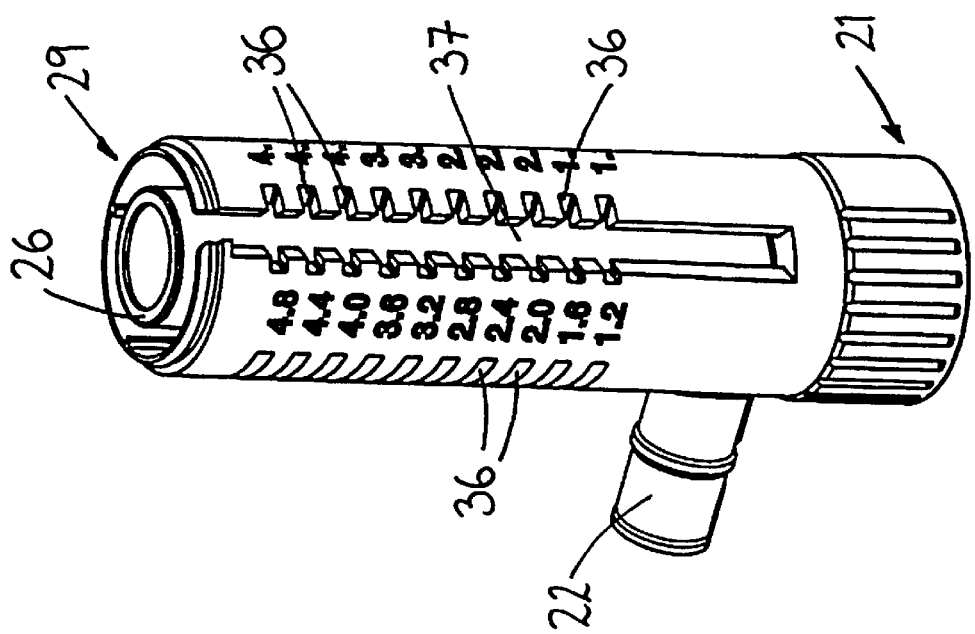
FIG. 3 is a perspective view of the dispenser casing.

Referring initially to FIGS. 1 to 7, the first embodiment of dose dispenser comprises an elongate cylindrical casing 20 arranged at its lower end 21 for connection to an externally threaded neck of a bottle, in order to permit the withdrawal of a measured dose of liquid from the bottle and then to discharge that measured dose out of an outlet nozzle 22. A plunger 23 is provided with an operating head 24 by means of which a piston 25 may be drawn upwardly within a cylinder 26 mounted within the casing 20, so lifting liquid from the bottle and then on depression of the operating head 24, the lifted liquid is discharged through the nozzle 22. An adjustable collar 27 is slideably mounted on the external surface of the casing 20, and can be locked in a required position to limit the upward movement of the plunger 23, and so to define the volume of the dose to be dispensed.

The cylinder 26 is formed integrally with the casing 20 and both the cylinder and the casing are open at the upper ends 29 thereof. The lower end of the cylinder is closed by a seal member 30 having a bore 31 therethrough, communicating with a spring-loaded ball check valve 32 provided within a housing 33 fitted within the lower end 21 of the casing. The ball and spring of valve 32 are retained in the housing 33 by a hollow plug 28 which also seals to the member 30. A dip-pipe 34 (FIGS. 6 and 7) is connected to the lower end of the housing 33 before the dispenser is coupled to a container, for the dispensing of liquid therefrom.

The wall of the casing 20 is provided with a plurality of recesses 36, each extending wholly through the wall to communicate with the annular space between the casing and the cylinder 26 therewithin. The recesses are arranged in four columns at 90° to each other, and with the recesses arranged in a helical manner, as shown in the partial developed view of FIG. 4. A channel 37 extends parallel to the axis of the casing centrally along one of the columns of recesses, for a purpose to be described below. Between each column of recesses are provided index numerals which, though not shown in FIGS. 1 to 5, are shown for example in FIGS. 14, 15 and 17B. Each recess has a corresponding index numeral associated with it, though not necessarily immediately adjacent it. In an alternative design, the recesses 36 could extend only part way through the wall of casing 20.

Figures 5, 6:
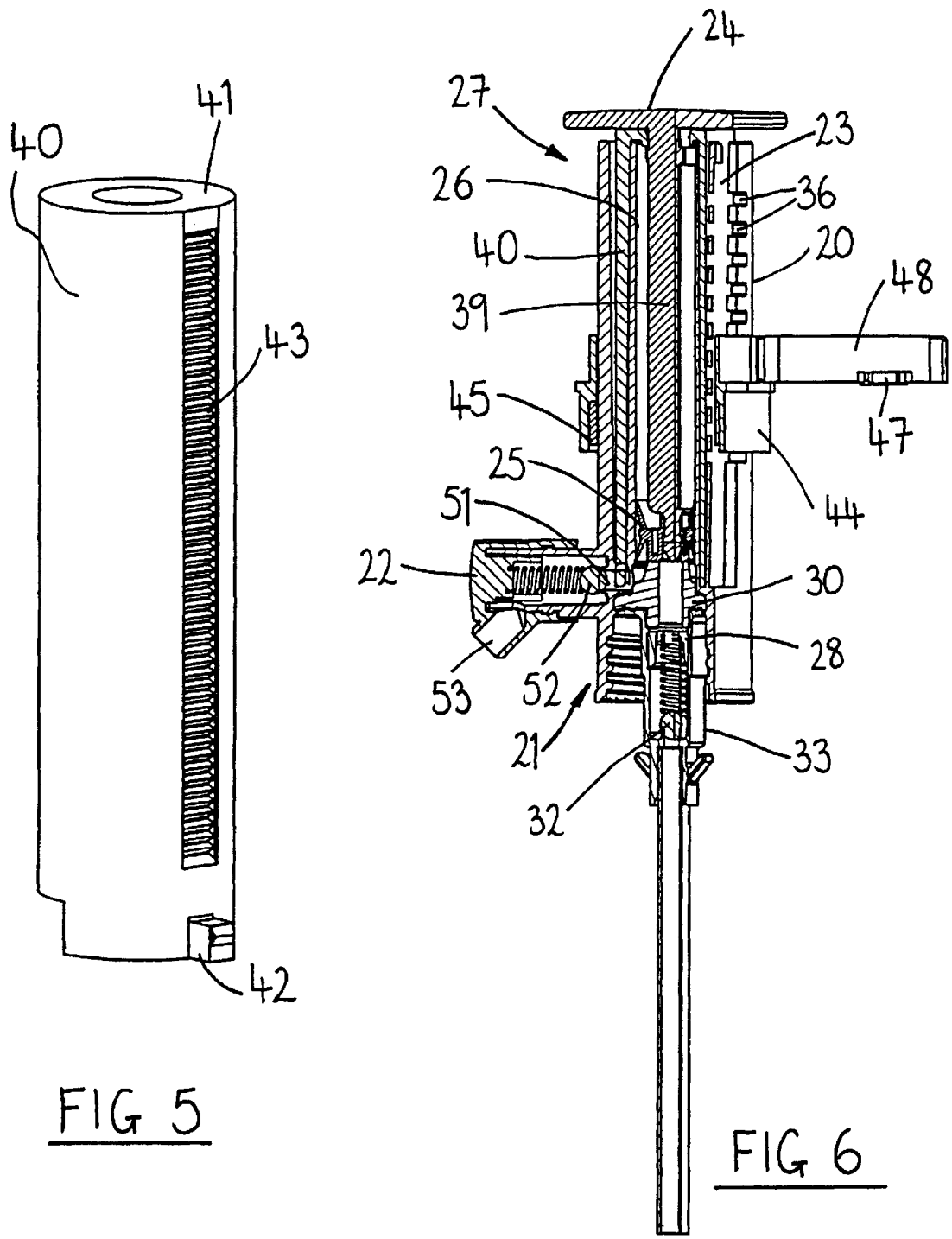
FIG. 5 is a perspective view of a plunger sleeve for the dispenser.
FIG. 6 is a sectioned perspective view on the dispenser, including a dip-pipe therefor.

The plunger 23 includes a piston rod 39 of cruciform section, with the head 24 mounted on the upper end thereof. The piston 25 comprises a resilient washer fitted to the lower end of the rod and is a sliding and sealing fit within the cylinder 26. A plunger sleeve 40 is a sliding fit in the annular space between the cylinder 26 and the casing 20, the sleeve having an inwardly turned flange 41 at its upper end. The sleeve 40 is mounted on the piston rod 39 by means of the flange 41, which is received in a recess beneath the head 24, to secure the sleeve against movement with respect to the rod. At the lower end of the sleeve 40, there is an outwardly projecting peg 42, which is a sliding fit within the channel 37. This restrains rotation of both the sleeve and the rod 23. As best seen in FIG. 5, a column of serrations 43 is aligned with the peg 42.

The collar 27 has annular first and second parts 44 and 45 coupled together in such a way that they may rotate relatively but slide in unison along the length of the casing 20. The first part 44 has a window 46 which may be aligned with any selected index numeral on the casing so that the whole of the index numeral may be viewed through the window. When in such a position, a stop 47 provided on a hinged arm 48 may be pressed into a corresponding recess 36, the arm then snapping behind a catch therefor, to retain the arm in the closed position. The edges of the stop 47 are bevelled so as to assist the entry of the stop into a selected recess and accurately to position the collar with respect to the selected recess, when fully home.

The second part 45 of the collar has an abutment 49 (FIG. 7) located in the channel 37 for sliding movement therealong, as the first part 44 is moved axially to have a selected index numeral positioned within the window 46. The inwardly directed face of the abutment 49 is serrated and engages the serrations 43 on the plunger sleeve 40, so as to resist axial movement of the plunger sleeve, and so also the plunger, until a sufficient force has been applied to the plunger.

A port 51 (FIG. 6) is formed through the casing at the lower end of the cylinder 26 and communicates with the nozzle 22. A spring-loaded ball check valve 52 is provided within the nozzle and downstream of the valve is an outlet spout 53.

FIG. 8 shows a modification of the casing 20, to confer a degree of child-resistance to the dispenser. The channel 37 is provided with an extension 54 at its lower end, which extends in the circumferential direction and is provided with a receptor 55 for the peg 42 on the plunger sleeve 40. The peg may be located in the receptor by pressing downwardly on the plunger head 24; the downward pressure causes the peg 42 to ride on the angled bottom wall of the channel 37 to guide the peg into the receptor 55, with a snap action. Conversely, to release the peg from the receptor, the head must be pulled upwardly and simultaneously twisted in a counter-clockwise direction (when viewed from above) in order to set the dispenser ready for dispensing a selected dose.

FIGS. 9, 10A and 10B show an alternative arrangement for conferring a degree of child-resistance. Here, a slider 56 is mounted at the upper end of the piston rod 39, between the sleeve 40 and plunger head 24, for sliding movement transversely of the plunger. The slider includes a pair of spring arms 57 which engage lands on the cruciform piston rod 39 and urge the slider to the right, in FIGS. 9 and 10. The slider includes a hook member 58 which depends downwardly from one side and on the opposite side is an operating surface 59 which effectively forms a part of the plunger head 24. An outwardly directed lip 60 is formed at the upper end 29 of the casing and extends partway therearound, on the opposite side to the channel 37.

Depression of the plunger 23 with an increased force from its normal base position will snap the hook member 58 over the lip 60, to engage therebehind and so lock the plunger, as shown in FIG. 10A. To release the plunger, the operating surface 59 must be pressed against the spring bias provided by the arms 57, so moving the hook member 58 clear of the lip 60, as shown in FIG. 10B.

The lower end 21 of the casing 20 shown in FIG. 2 is internally threaded, for interengagement with the conventional external threads on a bottle neck and which otherwise would receive a cap or other closure. FIGS. 11 to 13 show alternative arrangements in order to facilitate the attachment of the casing to an externally threaded bottle neck, merely by pressing the casing down on to the neck and obviating the need to make a threaded connection.

In the arrangement of FIG. 12, the lower end of the casing is formed as a bell housing 62 having four apertures 63 formed therethrough. A stiff but resilient locking member 64 is fitted into the bell housing 62 and has lugs 65 which engage in the aperture 63. The locking member 64 has a plurality of upwardly and inwardly projecting fingers 66, which are adapted to engage behind a bead 67 formed at the free end of the bottle neck 68. The lower part of the locking member 64 fits against a lower bead 69 below the threads on the neck, and the housing 33 for the check valve 32 is a close fit within the neck of the bottle. The upper end of the neck engages an outwardly projecting flange 70 to effect a seal thereagainst, when the fingers fully engage behind the bead 67. In this way, the dispenser is stably mounted on the neck of the bottle even though it is not tightened down using the external threads.

FIG. 13 shows an alternative design to that shown in FIG. 12 but like parts are given like reference numerals. Here, the apertures 63 are formed towards the upper end of the bell housing 62 and a locking member 71 has fingers 66 projecting inwardly and upwardly from the lower end of the locking member, to engage behind the lower bead 69 of the bottle neck. Internally, the upper end of the bell housing 62 has a smaller diameter directly to engage the threads on the bottle neck and so to assist in stably mounting the casing on the bottle.

In use, the casing is fitted to a bottle of liquid either by screwing the threads at the lower end of the casing on to the external threads on the bottle neck (for the arrangement of FIG. 2) or merely by pressing the casing on to the bottle neck (for the arrangements of FIGS. 12 and 13). The collar 27 is set so that the required dose is visible through the window 46 and the collar is then locked in position by pressing the hinged arm 48 inwardly to engage the stop 47 thereof in the corresponding recess 36. After releasing the child resistant lock (if provided), the plunger is pulled upwardly to fill the space beneath the piston with liquid, which passes through the check valve 32 while check valve 52 prevents the ingress of air into the cylinder. Upward movement of the plunger is limited by the peg 42 on the plunger sleeve 40 engaging the underside of the abutment 49 on the second part of the collar, locked at the required dose setting. Thereafter, the plunger head 24 is pressed downwardly, to discharge the dose through the second check valve 52, the nozzle 22 and spout 53. The first check valve 32 resists the return of liquid into the bottle.

FIGS. 14 to 17 show a second embodiment of dispenser which is generally similar to that described above primarily with reference to FIGS. 1 to 5, and will not be described again in detail. This second embodiment differs in that no side port leading to a radial outlet nozzle 22 is provided; rather, a single port 72 (FIG. 15B) is formed internally within the lower end of the casing 20, so that a charge of liquid drawn into the cylinder 26 may be dispensed downwardly through that port once the casing has been released from a bottle, as shown in FIGS. 16 and 17.

Figures 15A, 15B:
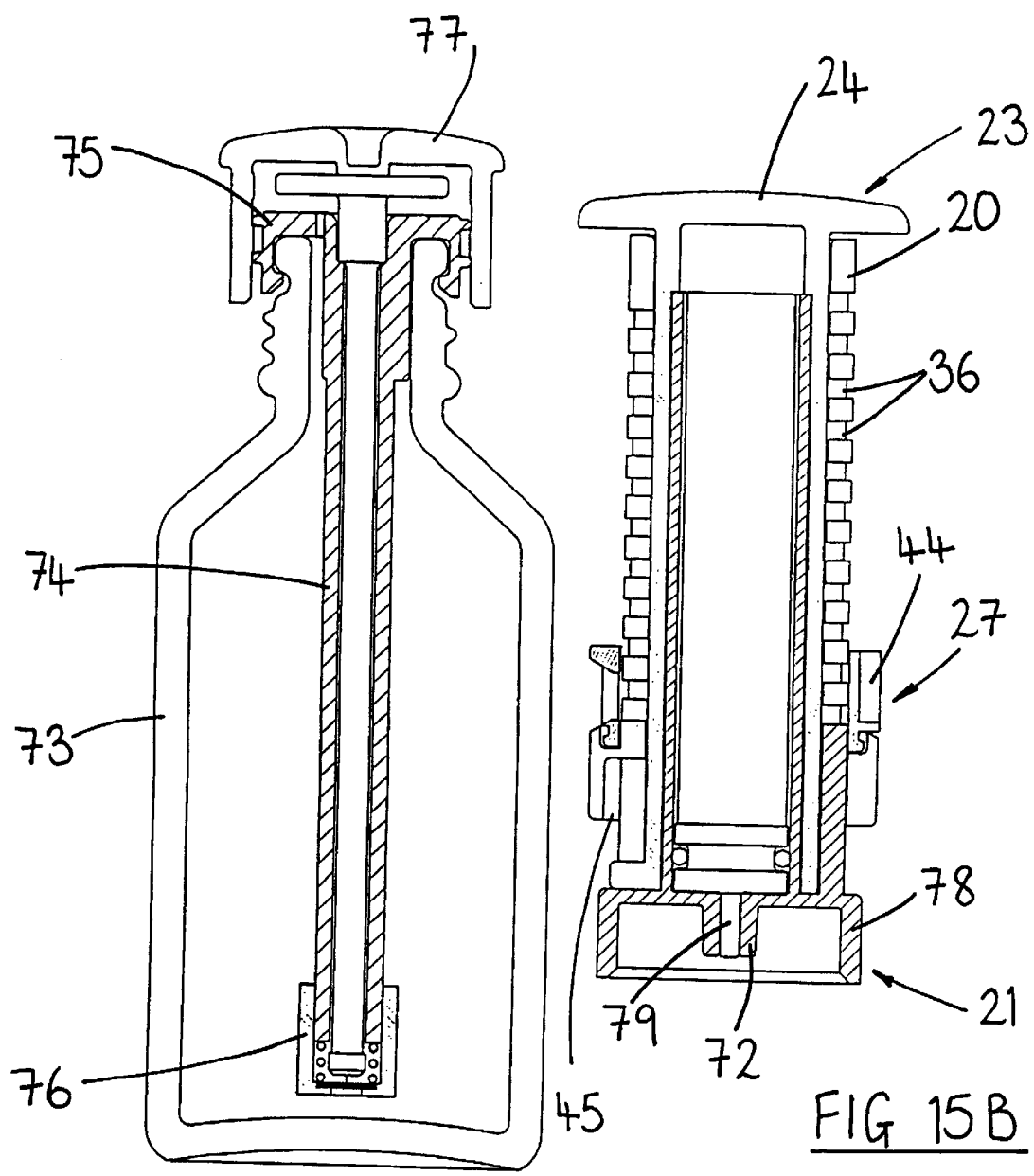
FIGS. 15A and 15B are vertical sections through the bottle and dispenser, respectively, of FIG. 14.

As shown in FIG. 15A, the bottle 73 is provided with a dip pipe 74 having a flange 75 at its upper end and which is snap-fitted to the bottle 73, in an essentially permanent manner. At its lower, the dip pipe includes a spring-loaded one-way diaphragm valve 76 permitting liquid to enter the dip pipe from the bottle but preventing the return of liquid to the bottle from the pipe. Prior to the connection of the dispenser (FIG. 15B) to the bottle (FIG. 15A), the bottle is closed by a cap 77.

The dispenser is generally similar to that described above but differs in that no valve is provided at its lower end 78. That lower end 78 is formed to fit over flange 75 in a sealing manner and has a single central nozzle 79 engageable in the upper end of the dip pipe 74. To use this dispenser, the casing is connected to the bottle and the required volume is drawn into the cylinder 26 following the setting of the required dose on collar 27. The dispenser is then removed from the bottle and the liquid drawn from the bottle is dispensed into a tumbler or cup by depressing the head 24 of the plunger, as shown in FIG. 17.

The collar 27 of this embodiment is of a slightly different form, with the window 46 formed in a recess 80 extending axially of the collar for the full height thereof, and with arm 48 hinged in a similar recess 81 on the opposite side of the collar (FIG. 16). The recess for the arm 48 has a lip along the edge wall 82 remote from the hinged connection of the arm, so that the free end of the arm may snap behind the lip to hold the arm in its closed position and with its stop engaged in a recess for the selected dose.

Figure 7:
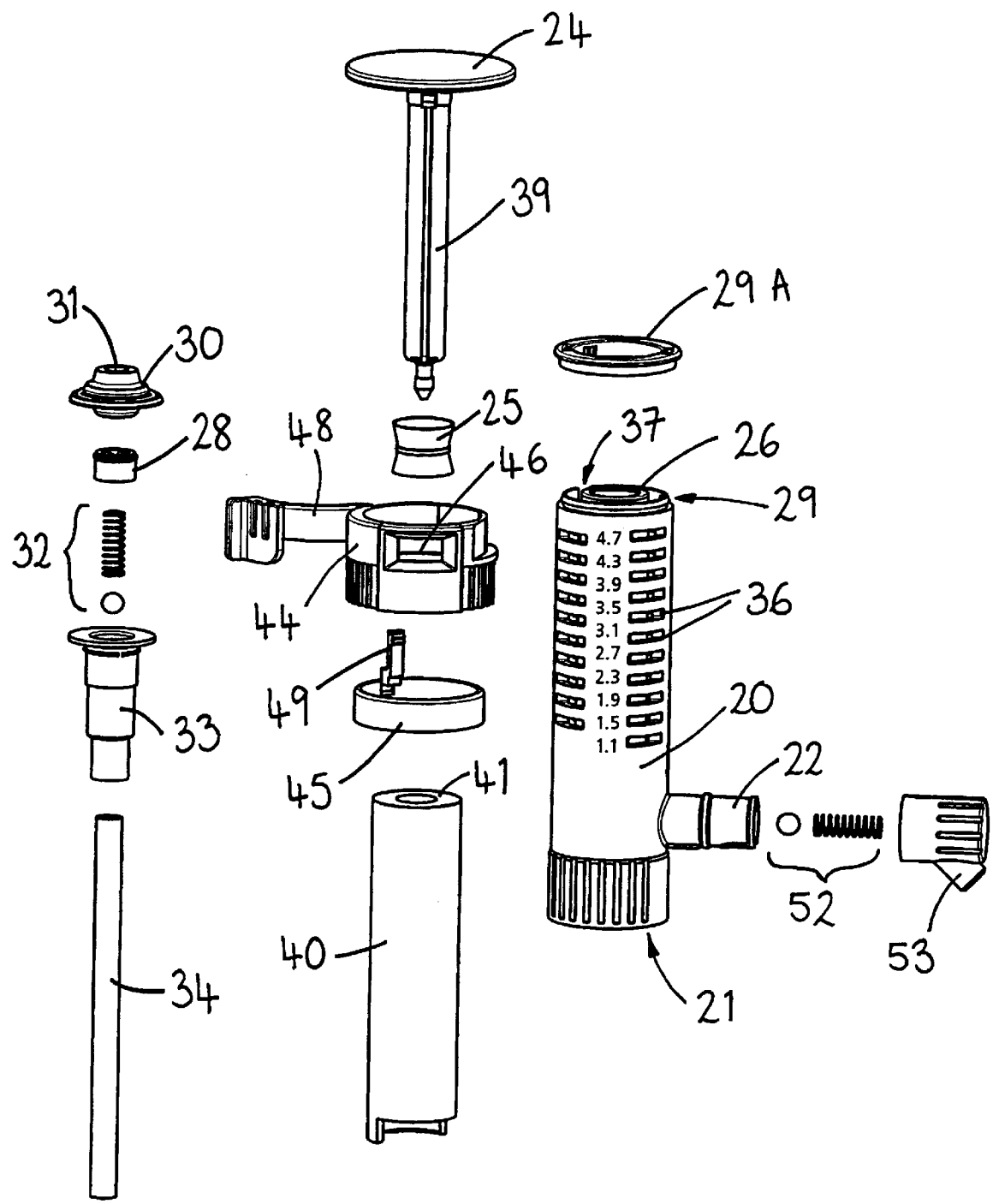
FIG. 7 is an exploded perspective view of the components forming the dispenser of FIG. 6.
Figure 18A:
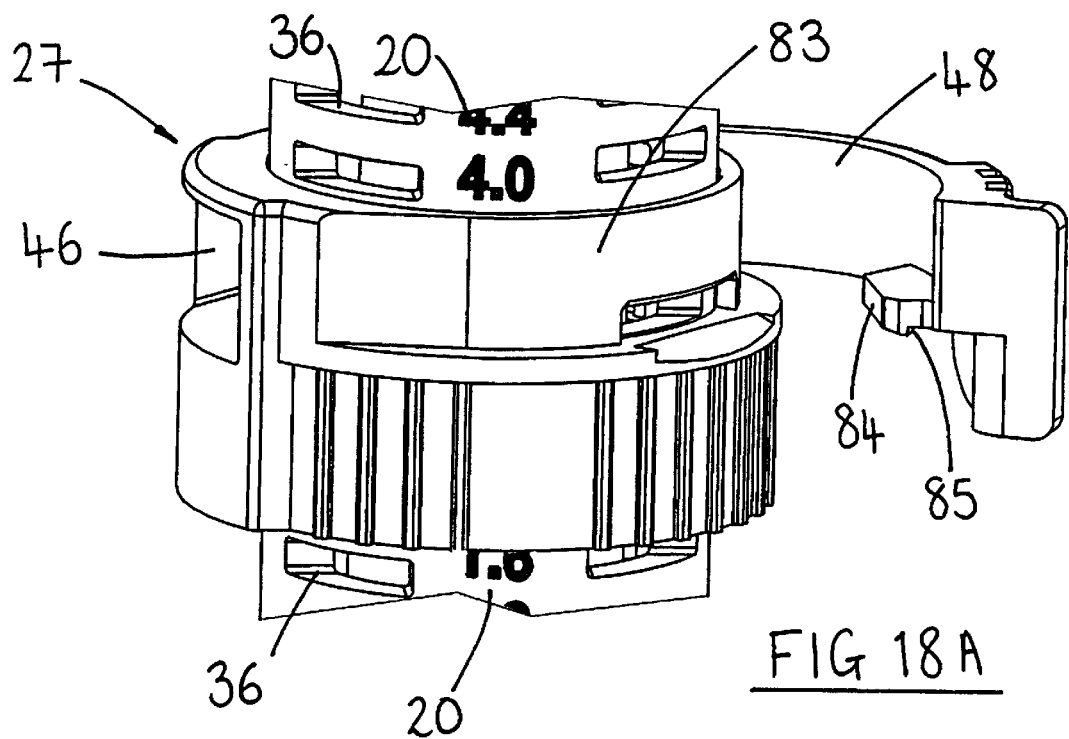
FIGS. 18A and 18B show in more detail the collar design, respectively in released and locked positions.
Figure 18B:
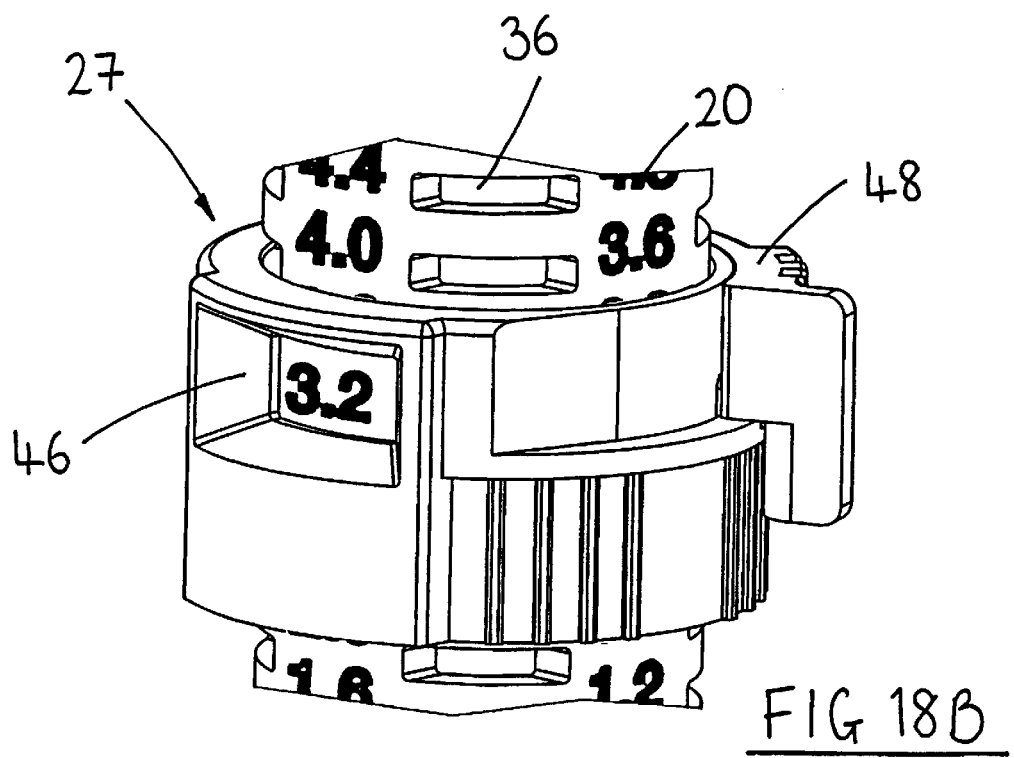

FIGS. 18A and 18B are enlarged views of the collar design shown from example in FIGS. 1, 2 and 7. As can be seen, the collar 27 is substantially cylindrical, with the window 46 formed through the whole thickness of the collar. The arm 48 is hinged within a circumferentially elongate recess 83, also formed through the whole thickness of the collar. The walls defining the stop 84 taper towards the free end of the stop to facilitate entry of the stop into a selected recess. A groove 85 is provided along the junction between the lower wall 86 of the recess and the arm 48 which groove snaps behind the inner wall of the collar as the arm 48 is closed fully, so resisting subsequent opening movement of the arm.

Figure 19:
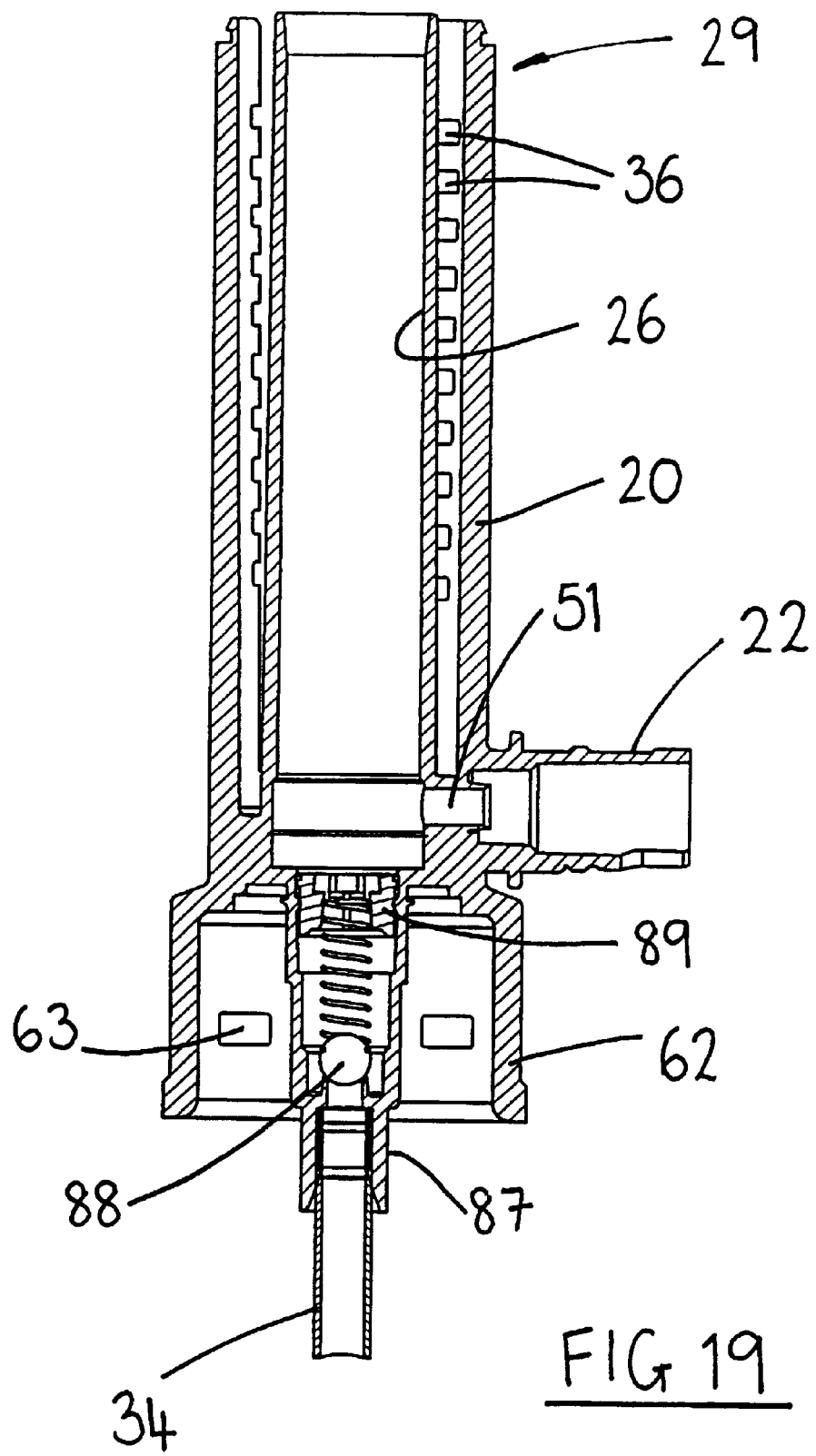
FIG. 19 is a vertical section through an alternative casing.

In FIG. 19, there is shown an alternative casing design which is generally similar to that of FIGS. 1, 2 and 6 and like parts are again given like reference characters; those parts will not be described again here. The lower end of the casing 20 has an integrally formed valve housing 87, into which a one-way ball valve assembly 88 is fitted from within the cylinder 26 and is secured in position by a hollow plug 89. The lower end of the housing 87 is arranged to receive a dip pipe 34, as with the previous embodiments. Also, the upper end 29 of the cylinder 26 is slightly flared, so as to give a lead-in for the piston of the plunger (not shown in FIG. 19).

The lower end of the casing is adapted to accommodate a locking member such as that shown in FIG. 12, for one-time use on a bottle not having a threaded neck. In other respects, this arrangement corresponds to those described above and is used in essentially the same manner.

Turning now to FIGS. 20 and 21, there is shown an adjustable collar 91 to replace collar 27 described above. This collar 91 has a ring 92 of generally cylindrical form and defining a window 93 for reading markings on casing 20. A band 94 has its two ends connected to the part of the ring 92 defining the window 93, to encircle with clearance the casing 20. Externally, the band 94 is provided with two finger buttons 95 disposed approximately at 90° to the window 93. Internally, and generally opposite the window, the band has a pair of circumferentially-spaced inwardly-projecting abutments 96. The abutments are in adjacent radial planes to permit simultaneous interengagement with two recesses respectively, formed on the casing 20.

The collar 91 is moulded from a resilient plastics material, so that when in its relaxed condition, the band 94 takes up a generally circular configuration as shown in FIG. 20B, with the abutments engaged in two adjacent recesses 36 of casing 20. Squeezing together the opposed buttons 95 causes the band 94 to deform as shown in FIG. 20A, moving the abutments 96 radially away from the casing and so freeing the collar 91 to slide axially along the casing to a chosen position. When the appropriate setting can be read through window 93, releasing the buttons 95 allows the abutments to engage the appropriate recesses, though it may be necessary to make a minor adjustment to the axial position of the collar, to achieve this.

In order to enhance the clarity of the markings visible through the window 93, the casing 20 may be provided with a series of axially-extending flats on which the markings are provided. Such flats are shown at 97 in FIG. 21B.

In other respects, the adjustable collar 91 functions as has been described above in relation to adjustable collar 27; collar 91 will not therefore be described in further detail here.

Figure 22A:
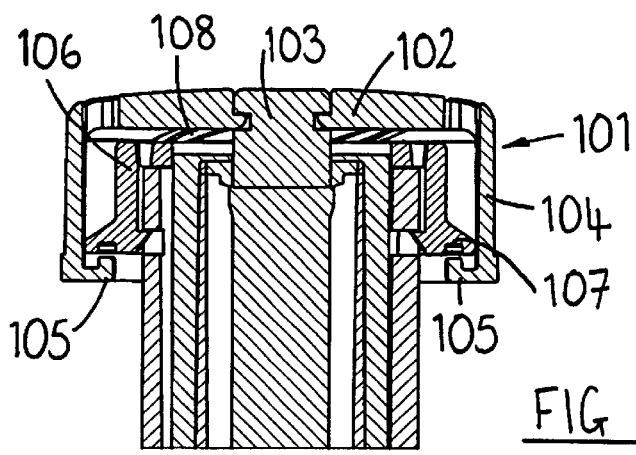
FIGS. 22A and 22B show a modified form of locking plunger head assembly for use with the dispenser of FIGS. 1 to 7.
Figure 22B:
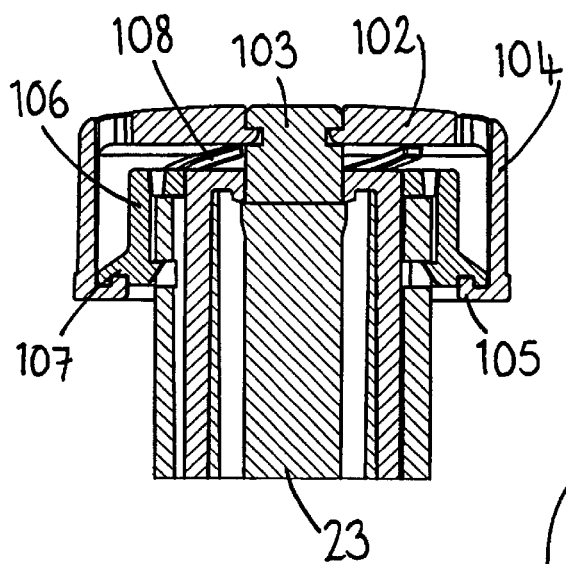
Figure 23:
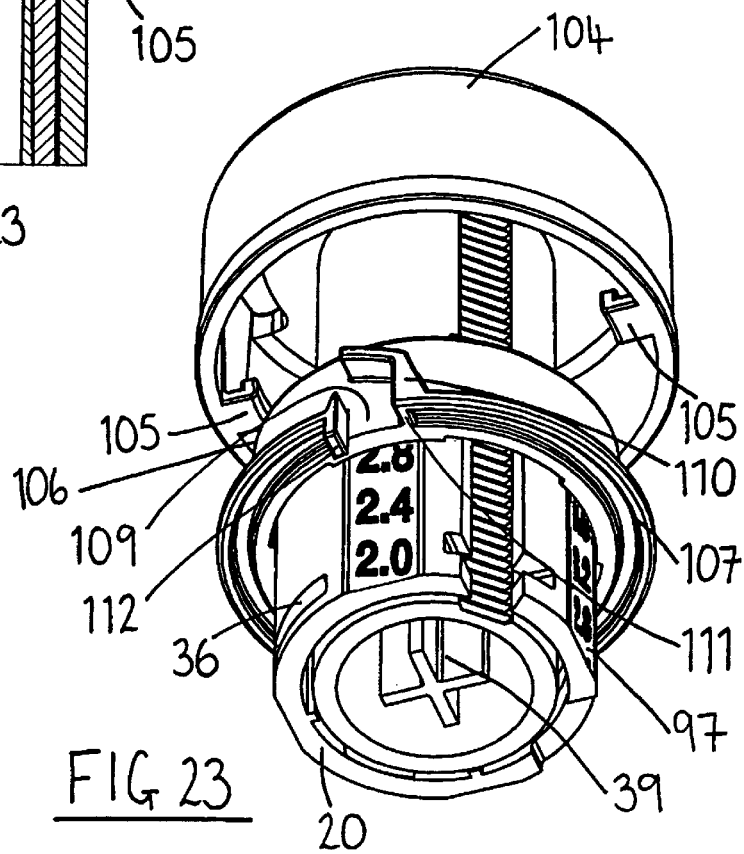
FIG. 23 is an isometric view of the assembly of FIGS. 22A and 22B but when released.

FIGS. 22 and 23, and FIGS. 23 and 24 respectively show two locking head assemblies for use with the plunger 23 of the embodiment described with reference to FIGS. 1 to 7. Each of these will now be described.

In the assembly of FIGS. 22A, 22B and 23, the plunger 23 is fitted at its upper end with a cap 101 having a top plate 102 connected to the plunger by stud 103, the cap having a depending skirt 104. Two diametrically opposed, inwardly-directed hook-shaped tabs 105 are provided on the lower edge of the skirt 104. The upper end 29 of the casing 20 is furnished with a collar 106 having a rim 107 at its lower end, the upper surface of the rim being bevelled as shown in the drawings. Four spring blades 108 project upwardly from the upper part of the collar 106, for engagement by the internal surface of the top plate 102 of the cap.

The rim 107 has a pair of channels 109 therethrough, a shaped guard wall 110 being provided on the collar above each channel and first and second stops 111 and 112 projecting downwardly from the rim, on both sides of each channel, respectively. The tabs 105 may pass through the channels 109 when appropriately aligned therewith but otherwise are normally disposed below the rim 107, as shown in FIG. 22B. The plunger is thus held in its fully depressed position by interengagement of the tabs 105 with the rim 107, the spring blades 108 serving to maintain the tabs engaged with the rim. In addition, the spring blades resist rotation of the cap 101 in a counter-clockwise direction, when viewed from above.

When a dose is to be dispensed, the cap 101 is turned clockwise until the tabs 105 engage the respective smaller first stops 111. The cap is then depressed against the action of the spring blades to ride the tabs over the stops 111 until the tabs engage the larger second stops 112; each tab is then aligned with and may enter the respective channel 109. Lifting the cap slightly engages the tabs with the walls 110, so causing the cap to turn a little further in the clockwise direction. From here, the dispenser may be primed with the pre-set dose, defined by the adjustable collar 27 (or 91) as has been described hereinbefore.

The dose is dispensed by pressing down on the cap 101 to drive the plunger to the bottom of its stroke. As this point is reached, the tabs 105 ride over the bevelled rim 107, to re-engage therebehind, making an audible click at the same time, to inform a user that the full dose has been dispensed. The walls 110 ensure that the tabs 105 will not be aligned with the channels 109 at the completion of the stroke, so ensuring that the releasing action described above must be performed next time a dose is to be dispensed.

Figure 24A:
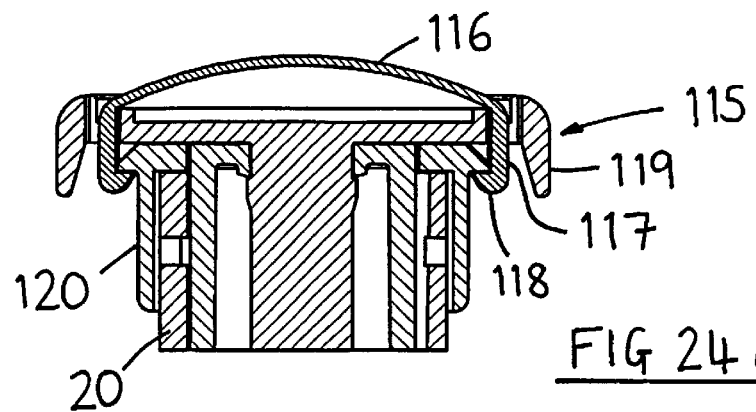
FIGS. 24A, 24B and 25 correspond to FIGS. 22A, 22B and 23 but of an alternative locking plunger head assembly.
Figure 24B:
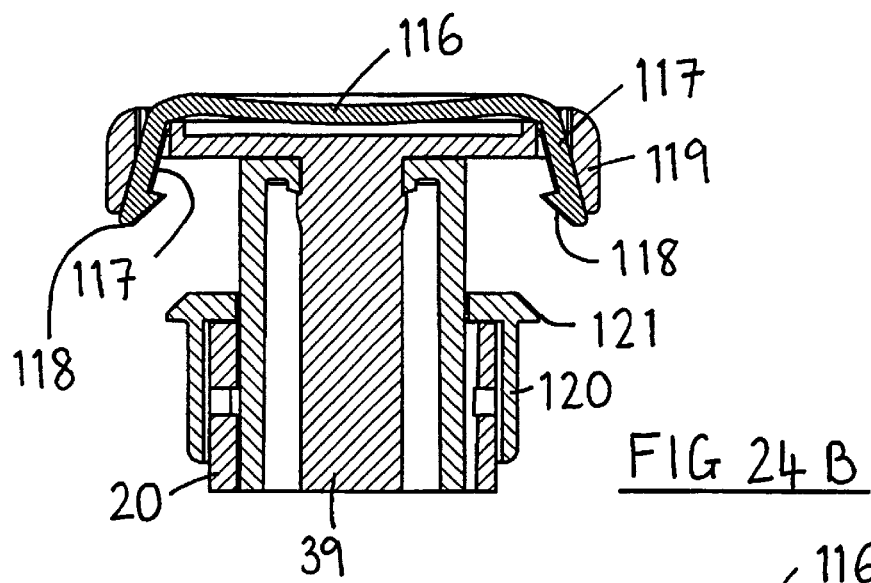
Figure 25:
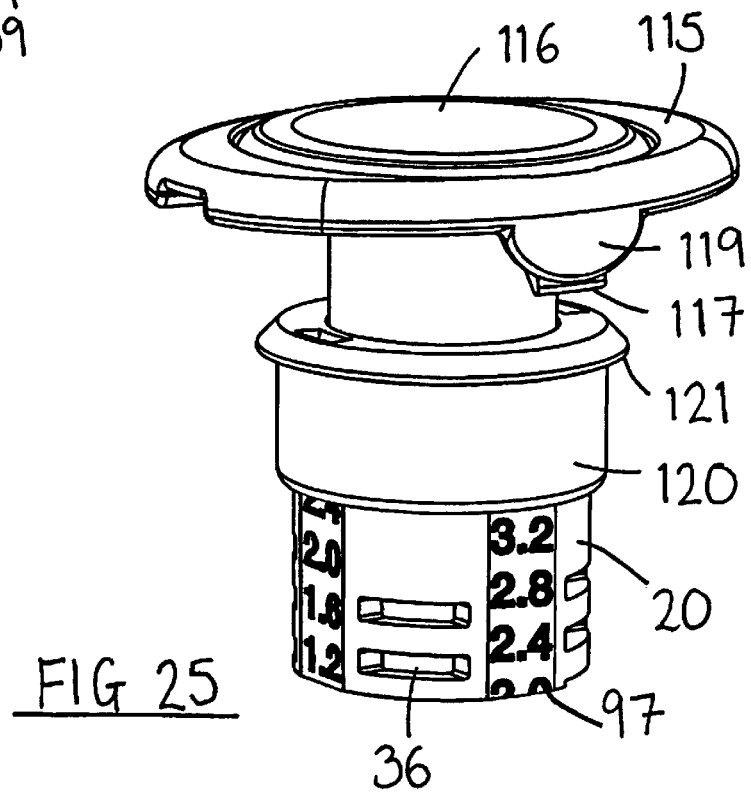

In the assembly of FIGS. 24A, 24B and 25, the plunger 23 is fitted at its upper end with a cap 115 having a resilient central press-button 116. That press-button has a pair of opposed legs 117 depending downwardly through corresponding slots in the cap, each leg terminating in a barb 118. The legs 117 are partially covered and protected by means of a pair of opposed tabs 119 formed on the cap 115.

A collar 120 is furnished on the upper end of the casing 20, which collar has an outwardly-directed rim 121, behind which the barbs 118 engage, when the plunger is at the bottom of its stroke, as shown in FIG. 24A. Depression of the press-button 116 causes the legs 117 to move outwardly, as shown in FIG. 24B, so freeing the barbs 118 from the rim 121 and allowing the plunger to be drawn upwardly, to charge the dispenser with a dose to be dispensed. In view of the resilience of the press-button 116, release of it allows the legs 117 to return to the position shown in FIG. 24A ready to catch the barbs behind the rim 121 again.

The two plunger head assemblies of FIGS. 22 to 25 confer on the dispenser considerable child-resistant properties and so assist in preventing unauthorised use, by a minor, of the dispenser.

What is claimed is:

1. A dispensing apparatus for dispensing a measured dose of liquid from an attached container, which apparatus comprises:

an elongate cylindrical casing, one end of said cylindrical casing being adapted for mounting on a container, said cylindrical casing being open at the other end thereof, said cylindrical casing being arranged to communicate with an attached container, said cylindrical casing having a liquid outlet port adjacent said one end, said cylindrical casing having an outwardly directed lip;

a plurality of dose indications provided on the external surface of said cylindrical casing;

said cylindrical casing having a channel formed in a wall therein, said channel extending along the length of said cylindrical casing;

a plunger, said plunger having a piston with a rod attached thereto being co-operatively slidable within said cylindrical casing for pumping liquid out of the attached container and through said outlet port;

a dose control member, said dose control member being connected to the plunger, the dose control member arranged to slide in said channel;

a dose-setting collar, said dose-setting collar being slidable over the external surface of said cylindrical casing for alignment with a selected dose indication, said dose-setting collar and dose control member being interengageable to limit the movement of the plunger away from said one end;

restraining means, said restraining means being arranged between said dose-setting collar and said cylindrical casing, wherein said restraining means comprises a plurality of stop elements, said stop elements being arranged along the length of said cylindrical casing, said dose-setting collar being engageable with a selected stop element thereby being restrained against movement away therefrom; and a slider, said slider having a hook member, said hook member engageable with said outwardly directed lip on said cylindrical casing, said slider having at least one spring arm, said spring arm being engageable with said piston rod.

2. The dispensing apparatus of claim 1, wherein said cylindrical casing provides a cylindrical chamber, said cylindrical chamber being defined by a cylindrical tube mounted at said one end of said cylindrical casing, said cylindrical casing and said cylindrical chamber having an annular clearance defined therebetween.

3. The dispensing apparatus of claim 2, wherein said channel communicates with said annular clearance.

4. The dispensing apparatus of claim 3, wherein said dose control member comprises a sleeve slideably mounted within said annular clearance.

5. The dispensing apparatus of claim 4, wherein said dose control member has a first abutment which is slideably disposed within said channel.

6. The dispensing apparatus of claim 5, wherein said dose-setting collar defines a second abutment which runs in said channel and which is engaged by said first abutment of said dose control member when said plunger slides away from said one end.

7. The dispensing apparatus of claim 1, wherein said stop elements are disposed both along the length of said cylindrical casing and around the periphery thereof, in an helical array.

8. The dispensing apparatus of claim 7, wherein said dose indications comprise index marks, there being a unique index mark for each selectable dose and being associated with a corresponding stop element.

9. The dispensing apparatus of claim 8, wherein each of said stop elements is in the form of a recess in said cylindrical casing, and wherein said dose-setting collar has a peg engageable in selected recess.

10. The dispensing apparatus of claim 9, wherein said peg is mounted on an arm connected to said dose-setting collar, which arm is movable between a peg-engaged position and a peg-free position.

11. The dispensing apparatus of claim 9, wherein said peg is mounted on a band which surrounds said cylindrical casing, which band is resiliently deformable in order to move said peg into and out of engagement with the selected recess in said cylindrical casing.

12. The dispensing apparatus of claim 11, wherein said dose-setting collar is provided with a window through which a selected dose index mark may be observed when said dose-setting collar is engaged with the corresponding dose stop element.

13. The dispensing apparatus of claim 1, wherein releasable catch means is provided for said plunger, whereby said releasable catch means restrains the plunger at a base position with said piston adjacent to said one end of said cylindrical casing, until said releasable catch means is released.

14. The dispensing apparatus of claim 13, wherein said releasable catch means comprises an extension to said channel and which has a portion extending in the circumferential direction of said cylindrical casing, and wherein said dose control member is receivable in and removable from said extension by relative rotational movement with respect to said cylindrical casing.

15. The dispensing apparatus of claim 14, wherein said extension to said channel includes a step behind which said dose control member may be located.

16. The dispensing apparatus of claim 13, wherein said releasable catch means has a catch member mounted on said plunger, said catch member being engageable with an abutment at said other end of said cylindrical casing.

17. The dispensing apparatus of claim 16, wherein said catch member is defined by a cap having an inwardly-directed tab, said other end of said cylindrical casing being provided with a tab collar having an outwardly-projecting rim, behind which said inwardly-directed tab is engageable.

18. The dispensing apparatus of claim 17, wherein said outwardly-projecting rim of said inwardly-directed tab has a tab channel formed there-through, whereby said plunger may be moved away from said one end of said cylindrical casing only when said tab is aligned with said tab channel.

19. The dispensing apparatus of claim 16, wherein said plunger is provided with a button cap, said button cap having a resilient press-button which, when depressed, moves said catch member radially outward and out of engagement with said abutment at said other end of said cylindrical casing.

20. The dispensing apparatus of claim 1, wherein said one end of said cylindrical casing is provided with a container recess within which a neck portion of a container may be received, said container recess being provided with engagement means in order to engage externally-formed threads on the neck portion of the container.

21. The dispensing apparatus of claim 20, wherein said engagement means comprises a plurality of inwardly-directed resilient fingers, said plurality of inwardly-directed resilient fingers having free ends which are engageable with at least one external rib on the container neck, whereby said cylindrical casing may be mounted on the container neck by pressing said cylindrical casing on to the container neck.

22. The dispensing apparatus of claim 1, wherein a dip-pipe is provided at said one end of said cylindrical casing in order to communicate with liquid in an attached container, said dip-pipe having an associated one-way valve in order to prevent flow of liquid out of said cylindrical casing, said dip-pipe having a free end.

23. The dispensing apparatus of claim 22, wherein said one-way valve is provided at said one end of said cylindrical casing, said cylindrical casing further having an other one-way valve being associated with said liquid outlet port.

24. The dispensing apparatus of claim 22, wherein said one-way valve is provided at said free end of said dip-pipe wherein said one way valve is remote from said cylindrical casing.

* * * * *